(12) United States Patent  
Kondou et al.

(10) Patent No.: US 7,409,114 B2
(45) Date of Patent: Aug. 5, 2008

(54) OPTICAL MODULATOR

(75) Inventors: Katsutoshi Kondou, Tokyo (JP); Satoshi Oikawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/393,088

(22) Filed: Mar. 30, 2006

(65) Prior Publication Data  
US 2007/0081755 A1  Apr. 12, 2007

(30) Foreign Application Priority Data  
Mar. 31, 2005  (JP)  ............................. 2005-105401

(51) Int. Cl.  
*G02F 1/035* (2006.01)

(52) U.S. Cl. ............... 385/2; 385/11; 385/3; 385/8; 398/53; 398/98; 398/99; 398/100; 398/101

(58) Field of Classification Search ............ 398/98–103; 427/255.34, 255.28; 359/245–247; 385/1–15  
See application file for complete search history.

(56) References Cited

U.S. PATENT DOCUMENTS 5,627,920 A * 5/1997 Kato et al. ................. 385/2  
6,480,639 B2 * 11/2002 Hashimoto et al. ........... 385/14  
6,846,428 B2 * 1/2005 Saulys et al. ............... 216/101  
7,010,230 B2 * 3/2006 Lee et al. ................... 398/102

FOREIGN PATENT DOCUMENTS

| JP | 64-018121 | 1/1989 |
| JP | 10-133159 | 5/1998 |
| JP | 2003-215519 | 7/2003 |

* cited by examiner

*Primary Examiner*—Brian Healy  
*Assistant Examiner*—Guy G Anderson  
(74) *Attorney, Agent, or Firm*—Chapman and Cutler LLP

(57) ABSTRACT

An optical modulator using a thin plate including a portion having 20 μm or less thickness, capable of selecting a specific polarized wave from a light wave which propagates in an optical waveguide in the modulator without reduced productivity. The modulator includes an X-cut or Y-cut thin plate of a material having an electrooptic effect; an optical waveguide formed in a top or bottom surface of the plate; and a control electrode on the top surface of the plate to modulate light which propagates in the waveguide. An attenuating means which absorbs light having a specific polarization plane of a light wave which propagates in the waveguide is disposed in the vicinity of the waveguide. The attenuating means includes light absorbing members disposed at a gap L which is 0.5 to 2 times the mode-field diameter of the light wave which propagates in the waveguide with the waveguide interposed therebetween.

4 Claims, 5 Drawing Sheets (a)

(b)

OPTICAL MODULATOR

BACKGROUND OF THE INVENTION

1. Field of the Invention

The present invention relates to an optical modulator, and more particularly, to an optical modulator which includes a thin plate made of a material having an electrooptic effect and including a portion having a thickness of 20 μm or less, and a reinforcement plate attached to a bottom surface of the thin plate and having a thickness greater than that of the thin plate.

2. Related Art Statement

Conventionally, in an optical communication field or an optical measurement field, a waveguide type optical modulator in which an optical waveguide or a modulation electrode is formed on a substrate having an electrooptic effect is much used.

Particularly, as multimedia has been developed, the amount of communication tends to increase and thus wider bandwidth of an optical modulation frequency needs to be realized. As a realizing means thereof, an external modulation method using a LiNbO$_3$ (hereinafter, referred to as LN) modulator or the like has been diversified. However, in order to realize the wider bandwidth of the LN modulator, velocity matching between a light wave and a microwave which is a modulation signal and reduction of a driving voltage need to be realized.

As a means for solving the above-described problems, conventionally, the velocity matching has been realized by forming a buffer layer on a waveguide. However, recently, as a substrate processing technology is improved, the thickness of the substrate tries to decrease such that the velocity matching condition between the microwave and the light wave is satisfied and at the same time the driving voltage is reduced.

In Patent Documents 1 to 3, an optical waveguide and a modulation electrode are mounted on a thin substrate (hereinafter, referred to as "first substrate") having a thickness of 30 μm or less and another substrate (hereinafter, referred to as "second substrate") having dielectric constant lower than that of the first substrate is bonded to the first substrate, such that an effective refractive index of the microwave is lowered, the velocity matching between the microwave and the light wave is realized and mechanical strength of the substrate is maintained.

[Patent Document 1] Japanese Unexamined Patent Application Publication No. S64-18121

[Patent Document 2] Japanese Unexamined Patent Application Publication No. 2003-215519

[Patent Document 3] Japanese Unexamined Patent Application Publication No. H10-133159

Meanwhile, as the waveguide type optical modulator, an optical intensity modulator, an optical switch, a variable optical attenuator (VOA) or a phase modulator is developed and put into practical use. For example, in the VOA, the refractive index of the waveguide is changed by an electrooptic effect or a thermo-optic effect to adjust output light intensity, in a branch waveguide of one arm for configuring a Mach-Zehnder interferometer.

However, in a case of using a substrate having optical anisotropy, an applied voltage or the amount of heating varies depending on a polarized wave of incident light. Accordingly, only a specific polarized wave must propagate.

As a method of selecting a specific polarized wave, as shown in FIG. 1A, there is provided a method of attaching a polarizer 2 on the end surface of an entrance of a substrate 1 of an optical modulator. In a case of using an LN substrate, there is provided a method of attaching a metal film 4 on an optical waveguide 3 in an X-cut plate (see FIG. 1B) or a method of providing a slab to a side surface of an optical waveguide in a Z-cut plate.

However, when a thin plate having a thickness of 20 μm or less is used, it is difficult to attach the polarizer to the end surface of the substrate with high precision as shown in FIG. 1A. In addition, when the metal film 4 is attached to the top surface of the thin plate as shown in FIG. 1B, the substrate is at increased risk of being damaged by a difference in coefficient of thermal expansion between the substrate and metal film, and, when the metal film is formed on the optical waveguide 3, the specific polarized wave is absorbed and a light wave having a different polarization plane is also attenuated.

Since the above-described methods of selecting the specific polarized wave require a separate process in addition to a process of manufacturing the optical modulator, a manufacturing process becomes complicated and thus the manufacturing cost increases.

SUMMARY OF THE INVENTION

The present invention is to solve the above-described problems, and an object of the present invention is to provide an optical modulator using a thin plate including a portion having a thickness of 20 μm or less, which is capable of selecting a specific polarized wave from a light wave which propagates in an optical waveguide in the optical modulator without deteriorating productivity of the optical modulator.

In order to solve the above-described problems, according to a first aspect of the present invention, there is provided an optical modulator including: an X-cut or Y-cut thin plate made of a material having an electrooptic effect; an optical waveguide formed in a top surface or a bottom surface of the thin plate; and a control electrode which is formed on the top surface of the thin plate to modulate light which propagates in the optical waveguide, wherein an attenuating means which absorbs light having a specific polarization plane of a light wave which propagates in the optical waveguide is disposed in the vicinity of the optical waveguide and the attenuating means includes a light absorbing member.

According to a second aspect of the present invention, in the optical modulator according to the first aspect, the attenuating means includes a plurality of light absorbing members and the light absorbing members are disposed at a gap which is 0.5 to 2 times the mode-field diameter of the light wave which propagates in the optical waveguide with the optical waveguide interposed therebetween. The plurality of light absorbing members means that the light absorbing members are formed at a plurality of positions. When the attenuating means includes the plurality of light absorbing members, the members may be formed of a same material or different materials, if necessary.

According to a third aspect of the present invention, in the optical modulator according to the first or second aspect, the attenuating means is composed of at least a portion of the control electrode. The control electrode of the present invention includes a variety of electrodes disposed in the vicinity of the optical waveguide, such as a DC electrode, as well as a combination of a signal electrode and a ground electrode.

According to a fourth aspect of the present invention, in the optical modulator according to the first or second aspect, the attenuating means is formed in an optical waveguide portion of at least one of an input side and an output side of the optical waveguide.

According to a fifth aspect of the present invention, in the optical modulator according to the first or second aspect, the attenuating means is formed in at least one of the top surface and the bottom surface of the thin plate.

According to a sixth aspect of the present invention, in the optical modulator according to any one of the first to fifth aspects, the thin plate has a portion having a thickness of 20 µm or less.

According to the first aspect of the present invention, since the attenuating means including the light absorbing member which absorbs the light having the specific polarization plane of the light wave which propagates in the optical waveguide is disposed in the vicinity of the optical waveguide, it is possible to suppress the light wave which propagates in the optical waveguide from being attenuated, compared with a conventional case where a metal layer is disposed on the optical waveguide, and to efficiently attenuate only the specific polarized wave. Since the attenuating means is disposed in the vicinity of the optical waveguide except on the optical waveguide, it is possible to suppress the substrate from being damaged by a difference between coefficients of thermal expansion of the optical waveguide, substrate, and attenuating means, which are composed of different materials.

Particularly, when the thin plate is used as the substrate, since the light wave having the specific polarization plane seeps out of the top surface of the substrate as described below, it is possible to absorb the seeping light wave using the attenuating means.

When the thin plate is used, since the buffer layer need not be formed in order to realize the velocity matching between the microwave which propagates in the signal electrode for configuring the control electrode and the light wave which propagates in the optical waveguide, it is possible to directly form the attenuating means on the top surface or the bottom surface of the substrate and to more efficiently absorb the specific polarized wave.

According to the second aspect of the present invention, since the attenuating means includes the plurality of light absorbing members and the light absorbing members are disposed at a gap which is 0.5 to 2 times the mode-field diameter of the light wave which propagates in the optical waveguide with the optical waveguide interposed therebetween, it is possible to efficiently absorb the mode light having the polarization plane in the longitudinal direction (direction perpendicular to the top surface of the substrate) of the light wave which propagates in the optical waveguide and to suppress the mode light having the polarization plane in the lateral direction (direction parallel to the top surface of the substrate) from being attenuated.

According to the third aspect of the present invention, since the attenuating means is composed of at least the portion of the control electrode, it is possible to easily form the attenuating means only by adjusting the shape of the control electrode when forming the control electrode, and to suppress the complexity of the manufacturing process. In addition, since at least the portion of the control electrode also functions as the attenuating means, it is possible to shorten the optical modulator.

According to the fourth aspect of the present invention, since the attenuating means is formed in the optical waveguide portion of at least one of the input side and the output side of the optical waveguide, it is possible to output the light wave having only the specific polarized wave component from the optical modulator even when non-polarized light enters the optical modulator.

According to the fifth aspect of the present invention, since the attenuating means is formed in at least one of the top surface and the bottom surface of the thin plate, it is possible to increase a design freedom of the attenuating means. In addition, since the thin plate is used, even in the substrate surface opposite to the surface in which the optical waveguide is formed, it is possible to efficiently attenuate the specific polarized wave.

According to the sixth aspect of the present invention, since the thin plate has the portion having the thickness of 20 µm or less, especially in the portion having the thickness of 20 µm or less, the light wave having the polarization plane in the longitudinal direction much seeps out of the substrate and the polarized wave can be efficiently absorbed by the attenuating means.

Figure 1:
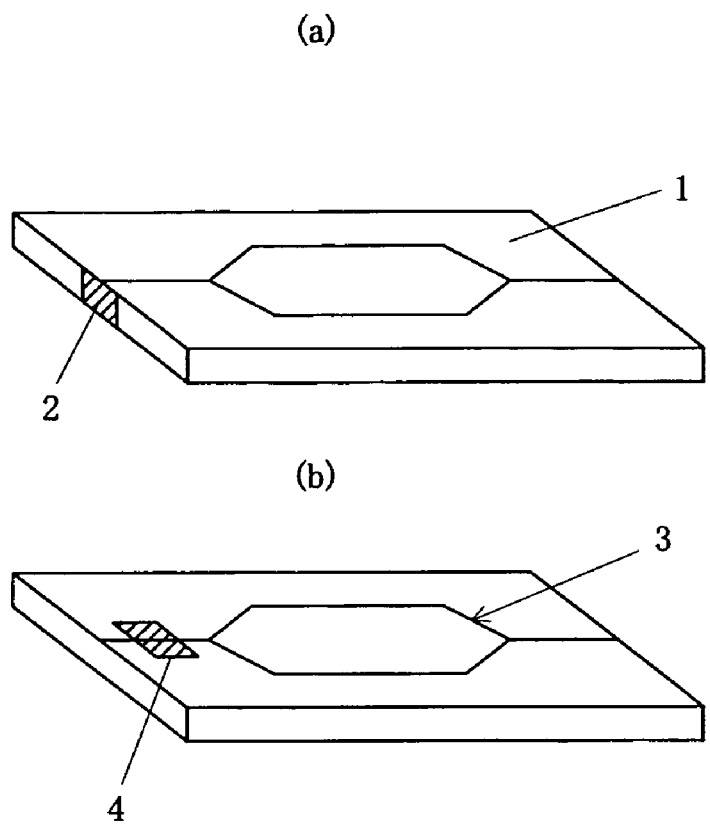
FIG. 1 is a view showing a polarized-wave selecting means of a conventional optical modulator.

| Reference Numerals | |
|---|---|
| 1: | substrate |
| 2: | polarizer |
| 3: | optical waveguide |
| 4: | metal film |
| 10, 11: | attenuating means |
| 20: | signal electrode |
| 21: | ground electrode |

DESCRIPTION OF THE EMBODIMENTS

Hereinafter, embodiments of the present invention will be described in detail.

Figure 2:
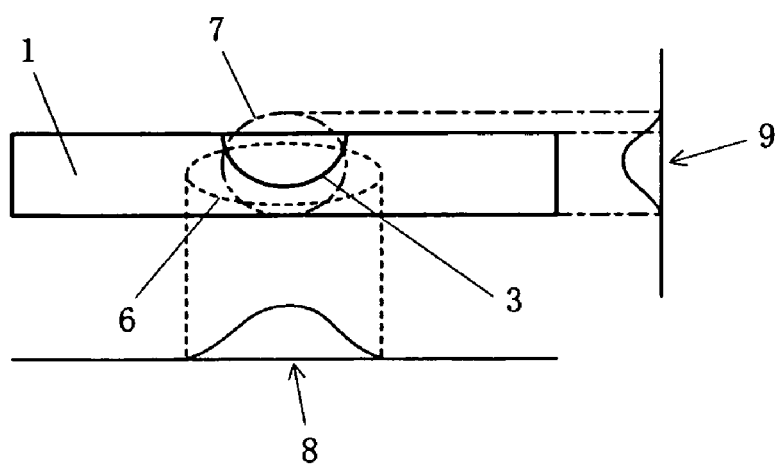
FIG. 2 is a view showing an optical intensity distribution of each polarization plane in an optical modulator using a thin plate.

FIG. 2 is a view schematically showing the state of a light wave which propagates in an optical waveguide 3 formed in a thin plate when the thin plate which is a substrate 1 having a thickness of 20 µm or less is used.

As the thickness of the substrate is reduced, a light wave 6 having a polarization plane in a direction parallel to the top surface of the substrate (lateral direction) and a light wave 7 having a polarization plane in a direction perpendicular to the top surface of the substrate (longitudinal direction) are different from each other in flatness of the light wave, as shown. The optical intensity distributions of the polarization planes vary as denoted by reference numerals 8 (intensity distribution of the polarization plane of the lateral direction) and 9 (intensity distribution of the polarization plane of the longitudinal direction), respectively. Particularly, the polarization plane in the longitudinal direction has a property that the smaller the thickness of the substrate, the more light wave seeps out of the top surface of the substrate.

In consideration of such phenomenon, the present inventors perfected the present invention by disposing an attenuating means for absorbing a specific polarized wave (particularly, a light wave having the polarization plane in the longitudinal direction) on the top surface or the bottom surface of the substrate in the vicinity of the optical waveguide 3.

Figure 3:
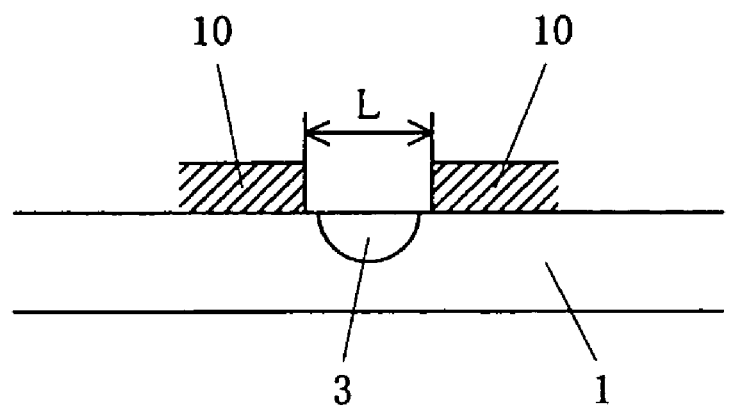
FIG. 3 is a view showing an optical modulator according to a first embodiment of the present invention.
Figure 3:
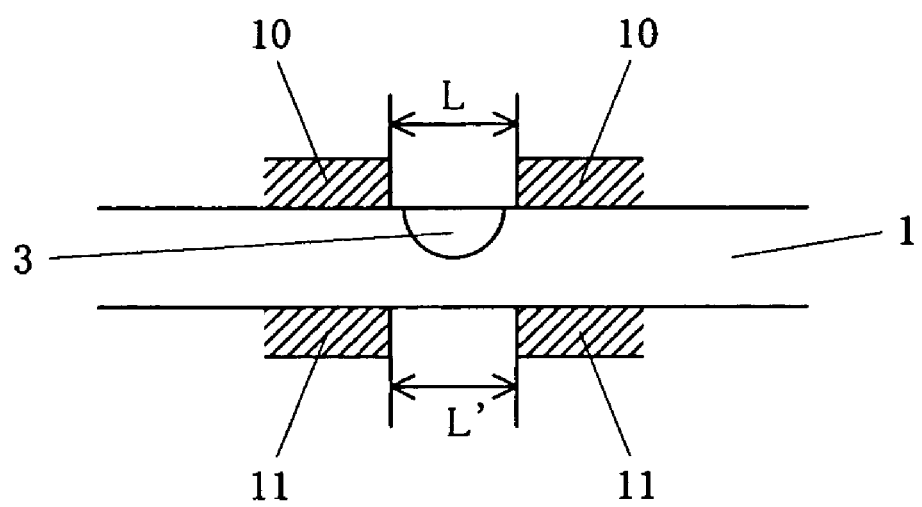

FIG. 3 is a view showing an optical modulator according to an embodiment of the present invention.

In FIG. 3A, the optical waveguide 3 is formed in the top surface of the substrate 1 for configuring the optical modulator and the attenuating means 10 are disposed on the top surface of the substrate in the vicinity of the optical waveguide except on the optical waveguide 3.

In FIG. 3B, the attenuating means 10 and 11 are disposed on the top surface and the bottom surface of the substrate 1.

The attenuating means 10 and 11 are disposed at predetermined gaps L and L' with the optical waveguide 3 interposed therebetween, respectively. The gap is influenced by the thickness of the substrate 1, the shape or the material of the optical waveguide 3, the shape (the length or the height taken along the optical waveguide) and the material of the attenuating means, but is preferably set in a range of 0.5 to 2 times the mode-field diameter (2W: diameter) of the light wave at a position (W: radius) in which a maximum intensity is attenuated to $1/e^2$ with respect to the optical intensity distribution of the light wave or the optical intensity distribution of each polarization plane in the light wave.

When L is smaller than W (0.5 times of the mode-field diameter), the polarized wave of the lateral direction as well as the polarized wave of the longitudinal direction is absorbed and thus the intensity of the light wave is reduced. When L is larger than 4W (two times of the mode-field diameter), it is difficult to efficiently reduce the polarized wave of the longitudinal direction.

The gap L' between the attenuating means 11 disposed on the bottom surface of FIG. 3B has the same condition as the gap L between the attenuating means 10 disposed on the top surface, since the smaller the thickness of the substrate 1, the more the polarization plane of the longitudinal direction seeps out of the bottom surface of the substrate 1 as well. Accordingly, it is possible to set a relationship of $L' \leq L$ in accordance with seepage of the light wave having the polarization plane of the longitudinal direction.

The arrangement of the attenuating means are not limited to FIG. 3A or 3B, and the attenuating means 10 of FIG. 3A may be formed at one side, or both the attenuating means 10 and 11 of FIG. 3B may be formed at one side. When the attenuating means is formed at one side, for example, arrangement of the attenuating means which is required when the two attenuating means are disposed as shown in FIG. 3A is determined and one attenuating means is then formed at one side in a state that the other attenuating means is removed.

A material having an electrooptic effect for configuring the substrate 1 may be, for example, lithium niobate, lithium tantalite, PLZT (lead lanthanum zirconate titanate), silica-based material, or combination thereof. More particularly, lithium niobate (LN) crystal having a high electrooptic effect is very suitably used. As the substrate 1, an X-cut plate or Y-cut plate may be very suitably used.

The attenuating means may be formed of a light absorbing material such as a metal film. In a case of using Al, there may be provided a method of previously forming an opening having a predetermined pattern using a photoresist film and depositing Al in the opening or a method of depositing Al on the entire top surface of the substrate and removing the deposited film except a predetermined region. Similar to a method of forming a control electrode such as a signal electrode, a ground electrode or a DC electrode of the optical modulator, there may be provided a method of forming an electrode pattern of Ti or Au and forming a metal film by a gold plating method.

When the attenuating means is formed of a plurality of light absorbing members, the members may be formed of a same material or different materials, if necessary.

The optical waveguide of the optical modulator may be formed by diffusing Ti or the like on the top surface of the substrate by a thermal diffusion method, like the prior art.

The control electrode such as the signal electrode or the ground electrode may be formed by formation of an electrode pattern of Ti or Au and the gold plating method. In the present invention, it is preferable that a buffer layer such as a dielectric layer of $SiO_2$ is not formed on the top surface of the substrate 1. By the configuration, it is possible to efficiently attenuate the polarized wave of the longitudinal direction, which seeps out of the top surface of the substrate.

In a method of manufacturing the thin plate including an optical modulator, the above-described optical waveguide, the control electrode and the attenuating means (only in a case where the attenuating means is formed on the top surface of the substrate) are formed in the substrate having a thickness of several hundreds μm and the bottom surface of the substrate is polished to have a thickness of, for example, 20 μm or less. The optical waveguide or the control electrode may be formed after manufacturing the thin plate. However, in this case, the thin plate may be damaged by thermal impact at the time of forming the optical waveguide or mechanical impact due to treatment of the thin film at the time of a variety of processes. Accordingly, it is preferable that a process which is apt to impact is performed before polishing the substrate. When the attenuating means 11 is formed on the bottom surface of the substrate 1 as shown in FIG. 3B, the attenuating means 11 is formed after polishing the substrate 1.

The thin plate in which the optical waveguide or the like is formed is bonded to a reinforcement plate having mechanical strength higher than that of the thin plate.

As a material used in the reinforcement plate, various materials may be used and, for example, a material having dielectric constant lower than that of the thin plate, such as quartz, glass or alumina, or a material having crystal orientation different from that of the thin plate may be used, in addition to the same material as the thin plate. A material having the same linear coefficient of expansion as the thin plate is preferably used for the purpose of stabilizing modulation characteristics of the optical modulator with respect to a change in temperature. When the material having the same linear coefficient of expansion as the thin plate is hard to select, a material having the same linear coefficient of expansion as the thin plate is used in an adhesive for bonding the thin plate and the reinforcement plate, like Patent Document 2.

As an adhesive layer for bonding the thin plate and the reinforcement plate, various adhesive materials such as an epoxy-based adhesive, a thermosetting adhesive, a UV-curing adhesive, a solder glass, a thermosetting, photocuring or phototackifier resin adhesive sheet may be used. Alternatively, by a direct bonding method, the thin plate and the reinforcement plate may be directly bonded without using the adhesive.

Figure 4:
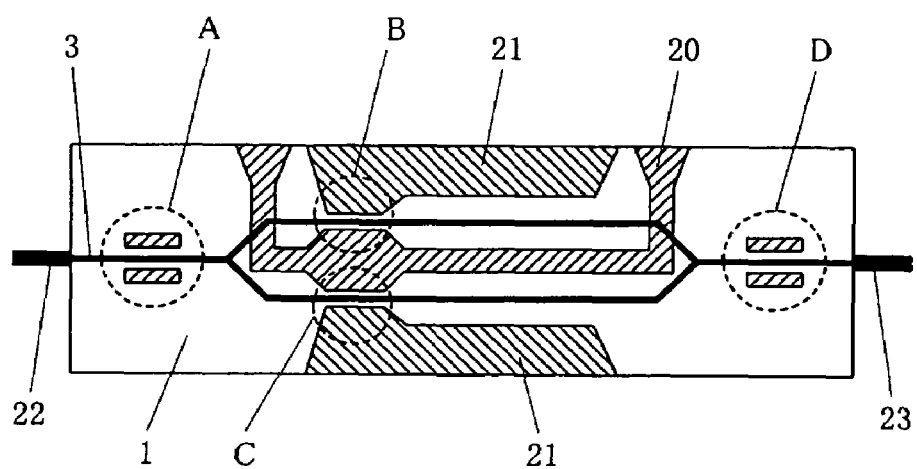
FIG. 4 is a view showing an optical modulator according to a second embodiment of the present invention.

FIG. 4 shows an optical modulator according to another embodiment of the present invention.

The Mach-Zehnder waveguide 3 is formed in the substrate 1 and various attenuating means are formed in the optical waveguide, as denoted by reference numerals A to D.

Reference numeral A or D shows an example that the attenuating means are disposed at the input side or the output side of the optical waveguide with the optical waveguide 3 interposed therebetween. When the light wave which propagates in the optical waveguide enters the optical modulator or the light wave is emitted from the optical modulator, it is possible to shape the light wave to a specific polarized wave. Reference numerals 22 and 23 denote incident and emitting optical fibers connected to the optical modulator, respectively.

Reference numeral B or C shows an example that the attenuating means are incorporated into a signal electrode 20 and a ground electrode 21, which are the control electrodes. In the attenuating means, the gap between the electrodes having the optical waveguide interposed therebetween is set to 0.5 to 2 times the mode-field diameter 2W of the light, as described above. These attenuating means can be easily formed only by adjusting the shapes of the control electrodes when the control electrodes are manufactured in the process for manufacturing the optical modulator.

Figure 5:
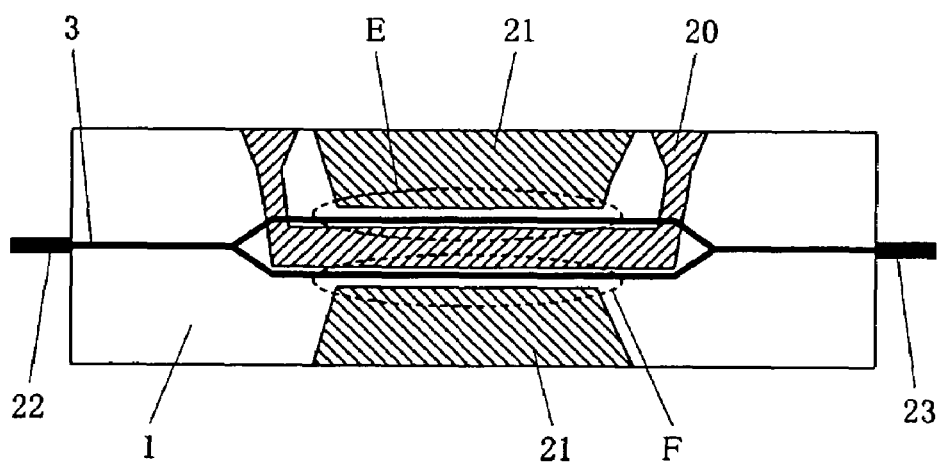
FIG. 5 is a view showing an optical modulator according to a third embodiment of the present invention.

Although, in FIG. 4, the attenuating means are formed in portions of the control electrodes, all the interaction portions of the control electrodes may be used as the attenuating means E and F such that effect for absorbing the light wave having the specific polarization plane increases, as shown in FIG. 5.

EXAMPLES

Next, examples of the optical modulator according to the present invention and the test thereof will be described.

First Example

In an optical modulator of a thin plate, an X-cut type LN substrate having a thickness of 500 μm was used as a substrate and a linear optical waveguide (width: 4 μm) was formed in the top surface of the substrate by a Ti diffusing process. Next, metal films of Au were formed as attenuating means by a plating process with the optical waveguide interposed therebetween such that the gap between the attenuating means was set to 1.4 times (20 μm) the mode-field diameter of the light wave which propagates in the optical waveguide and the length of the attenuating means taken along the optical waveguide was set to 2.1 cm. Thereafter, the bottom surface of the substrate was polished until the thickness of the substrate becomes 10 μm and was bonded to a reinforcement plate using UV-curing adhesive as an adhesive layer.

Second Example

The optical modulator was manufactured by the same method as the first example except that the gap between the attenuating means of the first example was set to two times (30 μm) the mode-field diameter.

When the extinction ratios of the polarized waves of the first and second examples were measured by a polarized wave controller or an optical power meter, the extinction ratio of the first example was 4.5 dB and the extinction ratio of the second example was 1.4 dB.

From this point, it can be seen that the attenuating means of the present invention efficiently attenuates the mode light having the polarization plane in the longitudinal direction.

Third Example

In an optical modulator of a thin plate, similar to the first example, an X-cut type LN substrate having a thickness of 500 μm was used as a substrate and a linear optical waveguide (width: 4 μm) was formed in the top surface of the substrate by a Ti diffusing process. Next, Ti was deposited on the both sides with the optical waveguide interposed therebetween and then metal films of Au were formed as attenuating means by a plating process such that the gap between the attenuating means is set to 1 to 3 times the mode-field diameter of the light wave which propagates in the optical waveguide and the length of the attenuating means taken along the optical waveguide is set to 4.0 cm, thereby manufacturing a plurality of optical modulators. Thereafter, the bottom surface of the substrate was polished until the thickness of the substrate becomes 10 μm and was bonded to a reinforcement plate using UV-curing adhesive as an adhesive layer.

Figure 6:
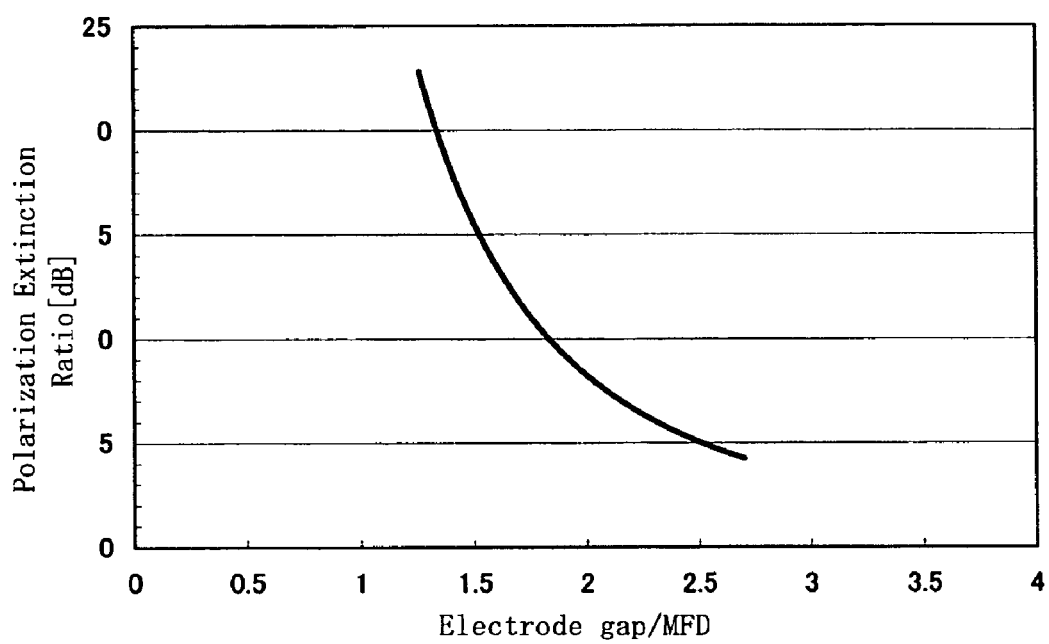
FIG. 6 is a graph showing a change in extinction ratio of a polarized wave versus a ratio of an electrode gap to MFD.
Figure 7:
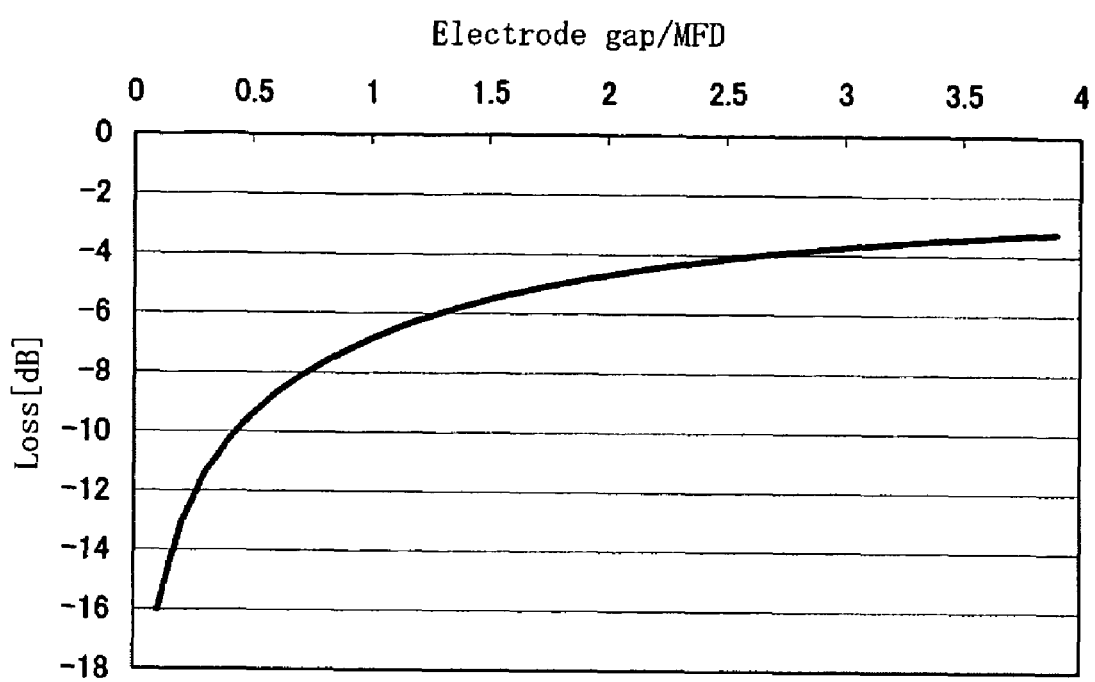
FIG. 7 is a graph showing a change in propagation loss versus a ratio of an electrode gap to MFD.

When the extinction ratio of the polarized wave and the propagation loss were measured with respect to the plurality of optical modulators manufactured in the third example by a polarized wave controller or an optical power meter, graphs of FIGS. 6 and 7 were obtained. FIG. 6 shows the extinction ratio of the polarized wave and FIG. 7 shows the propagation loss. Both the abscissas of the two graphs represent a ratio of the gap between the electrodes, which are the attenuating means, to a mode-field diameter (MFD) of the light wave which propagates in the optical waveguide.

The dotted lines of FIGS. 6 and 7 represent approximated curves of measurement values in the third example.

From the graph representing the extinction ratio of the polarized wave of FIG. 6, it can be easily seen that the extinction ratio of the polarized wave increases as a ratio of the electrode gap to MFD decreases. In general, the extinction ratio of the polarized wave required for the optical modulator is 7 dB or more, and, from the graph of FIG. 6, the electrode gap/MFD is preferably 2 or less.

From FIG. 7, it can be seen that, when the electrode gap decreases, the extinction ratio of the polarized wave is improved, but the propagation loss increases. This is because the polarized wave of the lateral direction as well as the polarized wave of the longitudinal direction is absorbed to reduce the intensity of the light wave. Accordingly, in consideration of the limit of the practical propagation loss (for example, about −10 dB) and the manufacturing limit of the electrode gap of the optical modulator, it is preferable that the electrode gap/MFD is 0.5 or more. More preferably, when the electrode gap/MFD is 1 or more, it is possible to sufficiently attenuate the specific polarized wave.

As described above, according to the present invention, it is possible to provide an optical modulator using a thin plate including a portion having a thickness of 20 μm or less, which is capable of selecting a specific polarized wave from a light wave which propagates in an optical waveguide in the optical modulator without deteriorating productivity of the optical modulator.

What is claimed is:

1. An optical modulator comprising:
   an X-cut or Y-cut thin plate made of a material having an electrooptic effect;
   an optical waveguide formed in a top surface or a bottom surface of the thin plate; and
   a control electrode formed on the top surface of the thin plate to modulate light which propagates in the optical waveguide,
   wherein
   the thin plate has a portion having a thickness of 20 μm or less,
   an attenuating means which absorbs light having a specific polarization plane of a light wave which propagates in the optical waveguide is disposed in the vicinity of the optical waveguide, and the attenuating means comprises light absorbing members which are disposed at a gap which is 0.5 to 2 times the mode-field diameter of the light wave which propagates in the optical waveguide, with the optical waveguide interposed therebetween.

2. The optical modulator according to claim 1, wherein the attenuating means is composed of at least a portion of the control electrode.

3. The optical modulator according to claim 1, wherein the attenuating means is formed in an optical waveguide portion of at least one of an input side and an output side of the optical waveguide.

4. The optical modulator according to claim 1, wherein the attenuating means is formed in at least one of the top surface and the bottom surface of the thin plate.

* * * * *